United States Patent
Beiter et al.

(10) Patent No.: US 10,423,796 B2
(45) Date of Patent: Sep. 24, 2019

(54) USER AUTHENTICATION

(71) Applicant: Hewlett-Packard Development Company, L.P., Houston, TX (US)

(72) Inventors: Michael B Beiter, Fort Collins, CO (US); Matthew Messinger, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 135 days.

(21) Appl. No.: 15/515,283

(22) PCT Filed: Sep. 30, 2014

(86) PCT No.: PCT/US2014/058236
§ 371 (c)(1),
(2) Date: Mar. 29, 2017

(87) PCT Pub. No.: WO2016/053287
PCT Pub. Date: Apr. 7, 2016

(65) Prior Publication Data
US 2017/0235964 A1 Aug. 17, 2017

(51) Int. Cl.
*G06F 21/60* (2013.01)
*G06F 21/33* (2013.01)
(Continued)

(52) U.S. Cl.
CPC .......... *G06F 21/602* (2013.01); *G06F 21/31* (2013.01); *G06F 21/32* (2013.01); *G06F 21/33* (2013.01);
(Continued)

(58) Field of Classification Search
CPC ........ G06F 21/602; G06F 21/31; G06F 21/32; G06F 21/33; G06F 21/44; H04L 9/0643;
(Continued)

(56) References Cited

U.S. PATENT DOCUMENTS

| 7,043,455 B1 | 5/2006 | Cuomo et al. | |
| 8,959,608 B2 * | 2/2015 | Ahmed | H04W 12/06 726/8 |

(Continued)

FOREIGN PATENT DOCUMENTS

| CN | 103475643 | 12/2013 |
| WO | WO-2013081150 | 5/2013 |

OTHER PUBLICATIONS

IBM Corporation, "WebSphere Application Server V7: Session Management," (Web Page), Oct. 13, 2009, found online at: http://www.redbooks.ibm.com/~68 pages.
(Continued)

*Primary Examiner* — Hee K Song
(74) *Attorney, Agent, or Firm* — HP Inc. Patent Department

(57) ABSTRACT

According to an example, to authenticate a user of a computing device, a user login request with at least one primary credential is received from a computing device. At least one primary credential is validated to authenticate the user, and a first device token is created and transmitted to the computing device. A secondary credential is received from the computing device, and a server token and a reference to the server token is created. The server token is encrypted and stored and the server token reference is sent to computing device for use in a subsequent authentication with the secondary credential.

15 Claims, 5 Drawing Sheets

(51) Int. Cl.
    *H04L 9/06*     (2006.01)
    *H04L 9/08*     (2006.01)
    *H04L 29/06*    (2006.01)
    *G06F 21/31*    (2013.01)
    *G06F 21/32*    (2013.01)
    *G06F 21/44*    (2013.01)

(52) U.S. Cl.
    CPC ............ *G06F 21/44* (2013.01); *H04L 9/0643* (2013.01); *H04L 9/0861* (2013.01); *H04L 63/06* (2013.01); *H04L 63/083* (2013.01); *H04L 63/0823* (2013.01); *H04L 63/0876* (2013.01)

(58) Field of Classification Search
    CPC ... H04L 9/0861; H04L 63/06; H04L 63/0823; H04L 63/083; H04L 63/0876
    See application file for complete search history.

(56) References Cited

U.S. PATENT DOCUMENTS

| | | |
|---|---|---|
| 2006/0101279 A1 | 5/2006 | Akita et al. |
| 2008/0022377 A1 | 1/2008 | Chen et al. |
| 2008/0040484 A1 | 2/2008 | Yardley |
| 2011/0206206 A1 | 8/2011 | Blom et al. |
| 2012/0023241 A1 | 1/2012 | Goel et al. |
| 2013/0054968 A1* | 2/2013 | Gupta ................. H04L 63/0428 713/168 |
| 2013/0117560 A1* | 5/2013 | Resch .................. H04L 9/3265 713/157 |
| 2013/0138791 A1 | 5/2013 | Thomas et al. |
| 2013/0340063 A1* | 12/2013 | Larsson ................ G06F 21/335 726/9 |
| 2014/0007205 A1 | 1/2014 | Oikonomou |
| 2014/0068702 A1 | 3/2014 | Hyndman et al. |
| 2014/0149742 A1 | 5/2014 | Yau |
| 2014/0331060 A1* | 11/2014 | Hayton ................. G06F 21/31 713/186 |
| 2015/0227725 A1* | 8/2015 | Grigg ..................... G06F 21/31 726/7 |
| 2016/0125397 A1* | 5/2016 | Strydom ............... G06Q 20/08 705/66 |
| 2018/0295136 A1* | 10/2018 | Quach .................. H04L 9/3215 |

OTHER PUBLICATIONS

Dacosta et al: "One-time cookies: Preventing session hijacking attacks with stateless authentication tokens" ACM Transactions, v12, #1~2012 pp. 1-24.

Dacosta et al;One-Time Cookies: Preventing Session Hijacking Attacks with Stateless Authentication Tokens;ACM Transactions Internet Technology;2012;25 pgs.

* cited by examiner

USER AUTHENTICATION

BACKGROUND

Computing systems, devices, printers, scanners, mobile devices, and electronic components in general may be sold or configured to work with a local or remote device, server, or service, such as a network server or a cloud-based service. Such devices may also be sold or configured with an input device for typing in or storing credentials on the device to access the local or remote device, server, or service.

DETAILED DESCRIPTION

Figure 1:
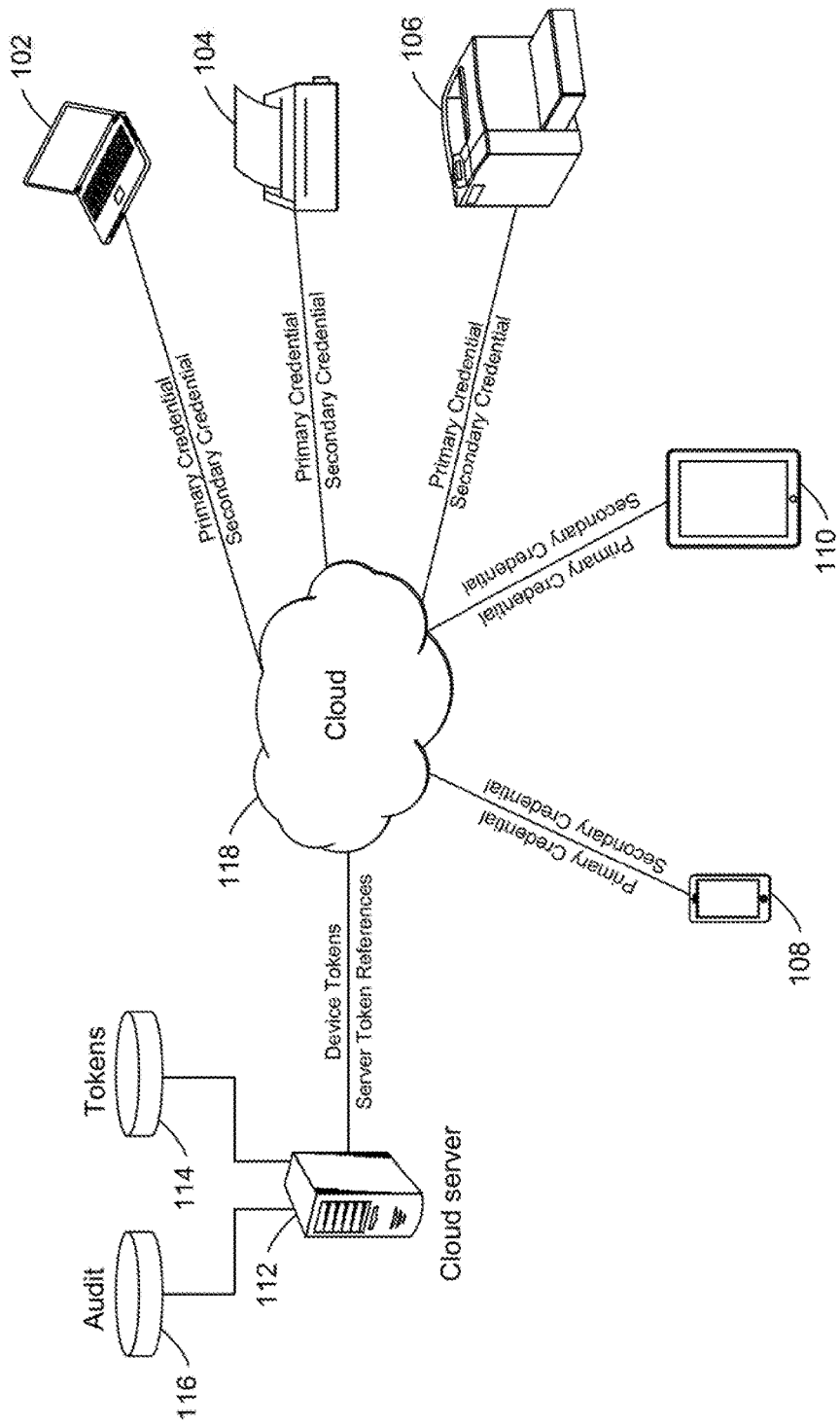
FIG. 1 illustrates a network-based system for accessing a server from a device, according to an example of the present disclosure.

Computing systems, devices, printers, scanners, mobile devices, and electronic components (hereinafter "devices") sold or configured to work with a local or remote device, server, or service, such as a network server or a cloud-based service (hereinafter "server") may prompt a user to enter credentials, such as a username and password, onto the device to authenticate to the server. In an example where the device is a printer, the user may enter a username and password for the server onto a small input device, such as a touch-screen mounted on a printer. In some cases, the touch-screen may comprise a soft keyboard with a single key used for the selection of several characters, and such keyboards may be of a limited size due to the nature of the device.

Entering in a full set of credentials on a device, and in particular on a small screen, may be time-consuming, tedious, and error-prone. This is especially the case where the user wishes to authenticate to the server from the device at a later time, requiring the same credentials to be entered each time the user returns to the device. User frustration may be compounded in cases where complex password guidelines are enforced by the server, affecting the overall user experience and desire to use a device, server, and/or service.

Further, as more devices come online, e.g., with the proliferation of the Internet of Things in both consumer and commercial applications, the number of devices causing user frustration with respect to authentication will continue to grow. Such frustration may also hinder the growth of certain services, such as cloud services, with customers reluctant to use a service deemed inconvenient.

In some cases, a device may be in a location where a more convenient authentication can be used once the user has initially logged in to a server with a full set of credentials. For example, a printer in a work environment may be in a location where certain authentication session data for a cloud printing service may be stored locally on the device, e.g., in a decentralized store, to allow for a streamlined user authentication once a user has initially provided a full set of credentials. In such cases, the printer may be configured to store certain data without storing confidential credentials such as a password locally that could be compromised by, e.g., malware targeted at devices, which would increase an attack surface and present identity theft opportunities, security token proliferation issues, and compliance risks. In a secure manner, the initial authentication may be stored or preserved on a server, and re-activated or re-authenticated at a later time on the device using credentials that are more convenient to enter and by themselves are not sufficient to fully authenticate a user.

According to an example, to authenticate a user of a computing device, a user login request with at least one primary credential is received from a computing device. At least one primary credential is validated to authenticate the user, and a first device token is created and transmitted to the computing device. A secondary credential is received from the computing device, and a server token and a reference to the server token is created. In some examples, the server token is encrypted and stored and the server token reference is sent to computing device for use in a subsequent authentication with the secondary credential.

FIG. 1 illustrates a network-based system for accessing a server from a device, according to an example of the present disclosure. In some examples of FIG. 1, a server validates a primary credential to authenticate a user, and a first device token is created and transmitted to a device which may transmit a secondary credential to the server to create a server token and a reference to the server token.

The network-based system 100 may comprise a device or devices, such as laptop 102, printer 104, printer 106, smartphone 108, and tablet 110, or other devices. As discussed above, devices 102-110 may be configured to work with a local or remote server to provide services such as cloud printing. Devices 102-110 may also comprise a mechanism for entering or receiving user authentication credentials, such as a touch screen or input for receiving a physical token or biometric input, or wired or wireless signals.

Devices 102-110 may communicate with a server, such as server 112, which may be a local server, e.g., a server maintained in an enterprise environment, or a remote server, e.g., a cloud server. Server 112 may be coupled to or communicate with a database or other electronic storage ("database") 114 comprising tokens used for authentication, and a database 116 used for auditing and/or logging data related to authentication on the system.

Devices 102-110, server 112, and databases 114 and 116 may communicate via a network 118, which may be any public or private network such as the internet, a cloud, a local area network, a wide area network, or other communication or transmission network.

Figure 2:
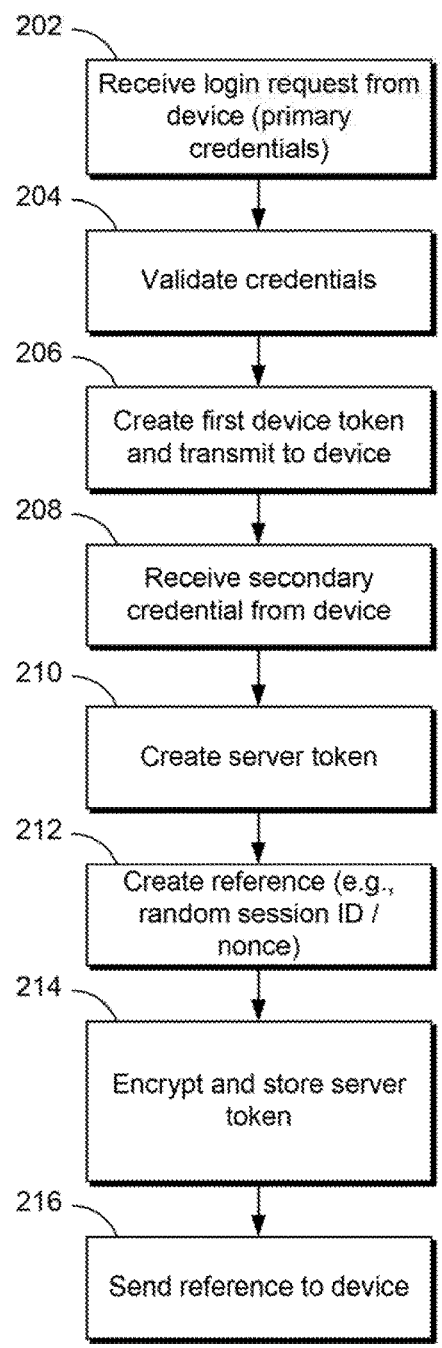
FIG. 2 illustrates a flowchart of an initial authentication of a user on a server, according to an example of the present disclosure.

FIG. 2 illustrates a flowchart of an initial authentication of a user on a server, according to an example of the present disclosure. The flow of FIG. 2 may be implemented as hardware or as a combination of hardware and software, such as in server 112. For example, the flow of FIG. 2 may represent executable instructions stored on machine-readable storage media and executed by a processor on server 112.

In block 202, the server receives an initial login request from a device, e.g., from a printer. The initial login request may comprise a primary credential or credentials, which may be a username and a password. The user may select to have the username or other identifier stored or "remembered" locally on the device, without storing the password locally.

In some examples, the username and/or password may be subject to security guidelines such that they are of a certain length and/or complexity, and such that one or both are changed on a scheduled basis. In some examples, the credential may be a biometric input such as fingerprint or facial recognition; a token such as an X.509 token; a physical or hardware-based token; two-factor authentication such as SMS authentication; or other secure credential.

In block 204, the server validates the primary credentials received in block 202. In the event that the primary credentials cannot be validated, the flow of FIG. 2 may halt and the user may be prompted that the primary credentials cannot be authenticated. In the event that the primary credentials are validated, the flow may proceed to block 206. In some examples, block 204 may comprise or communicate with a single sign-on ("SSO") solution to validate credentials, and may be built on protocols such as Security Assertion Markup Language ("SAML").

In block 206, following validation, a first device token is created on the server and transmitted to the device. In some examples, such tokens may be visible to both the server and the device. In some examples, the device may receive the first device token and prompt the user to enter a secondary credential on the device.

In some examples, the secondary credential may be a credential that is shorter or easier to remember than a primary credential password. For example, a secondary credential may be a personal identification number ("PIN"), a short phrase, a gesture, or a swipe. The device token may be transmitted via any network protocol, such as the REST/HTTP protocol, or using a secure protocol such as HTTPS. Users may also choose secondary credentials on a per-device or per-server level, such that different PINs, phrases, gestures, and/or swipes for example may be used.

In block 208, the secondary credential is received by the server, and in block 210, a server token is created. The server token may be any token used to securely reference stored authentication session details on the server.

In block 212, a reference or pointer to the server token is created. The reference may be a random session identifier or a nonce used to locate the server token at a later time. The nonce may be of high entropy, such as a random session ID of 128 to 256 bits, or higher.

In block 214, the server token is encrypted and stored on the server or in a database accessible by the server, e.g., token database 114. Various encryption methods may be used to encrypt the token. An encryption key may be derived from user input such as a secondary credential, a user provided secret, a photo of a user, or any input available to the server to increase the level of entropy.

For example, encrypting the server token may comprise using a hash value of a user input and the server token reference. Access to the server token in subsequent authentications will only be possible if both the reference and the secondary credentials are known. The combination of a reference of high entropy and a secondary credential, which may be of lower entropy, as an encryption key may result in a key that is not easily susceptible to brute force attacks.

In block 216, the reference to the server token is transmitted to the device. In some examples, the device may then store the reference to the server token locally, since the token does not comprise a user password that may be compromised. In some examples, the device may also store the reference to the server token in combination with a "human-readable" user identifier such as a username or e-mail address, so that the user can select the user identifier from a remembered list when the user wishes to authenticate again to the server from the device, e.g., the user identifier may be "remembered" securely by the device and displayed on, e.g., a touch input device or screen for selection. Fetching the reference is discussed in more detail below with respect to block 404 of FIG. 4.

Figure 3:
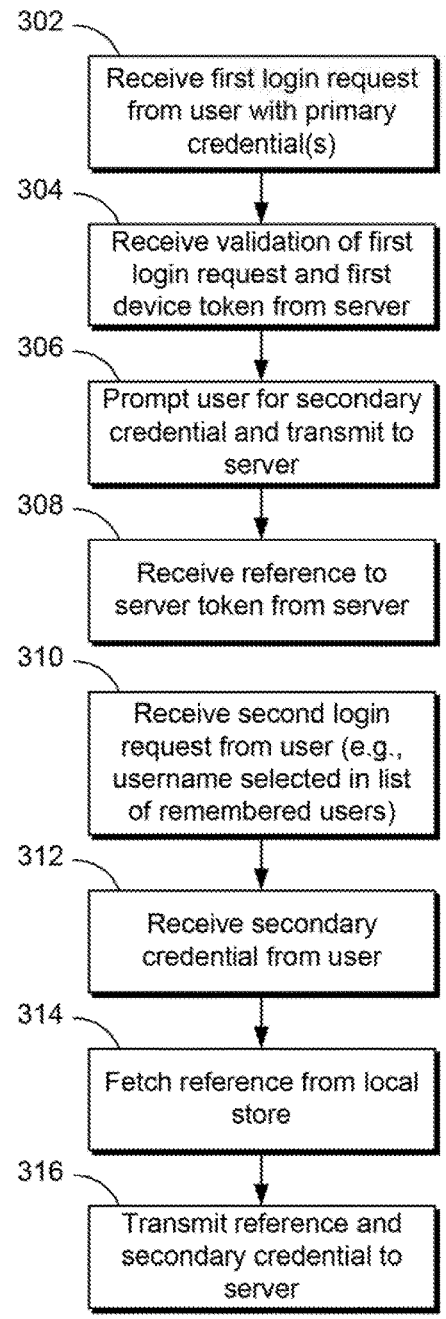
FIG. 3 illustrates a flowchart of a first and a second authentication of a user on a device, according to an example of the present disclosure.

FIG. 3 illustrates a flowchart of a first and a second or subsequent authentication of a user on a device, according to an example of the present disclosure. The flow of FIG. 3 may be implemented as hardware or as a combination of hardware and software, such as on devices 102-110. For example, the flow of FIG. 3 may represent executable instructions stored on machine-readable storage media and executed by a processor on devices 102-110, e.g., processor 502 discussed below with respect to FIG. 5.

In block 302, a first login request from a user with primary credentials is received, and in block 304, validation of the first login request from the server is received. In some examples, validation of the first login request may include receipt of a device token to e.g., authenticate a session on the device. In some examples, a login request may be entered on a touch screen or other input device, such as input device 516 discussed below in more detail with respect to FIG. 5.

In block 306, the user may be prompted to enter a secondary credential, such as a PIN discussed above. In block 308, the device may receive a reference to a server token from the server, e.g., from server 112.

In block 310, a second login request is received on the device from a user. As discussed above, the user may select a user identifier such as a user name from a list stored or "remembered" on the device, or otherwise enter in a user identifier to begin the login or authentication process.

In block 312, a secondary credential may be received from the user on the device. For example, the user may enter in a PIN or phrase on the device, or perform a gesture, swipe, or enter in another credential that is different from the primary credential password.

In block 314, the device may fetch a reference to a server token associated with the user identifier or username, as discussed above, stored locally on the device.

In block 316, the device may transmit the reference and the secondary credential to the server, or in some examples, may resolve the reference and send the secondary credential to the server such that the actual reference is not sent to the server. In some examples, the user identifier may be sent with the secondary credential, while in other examples it may be associated with the reference on the server and not re-transmitted.

Figure 4:
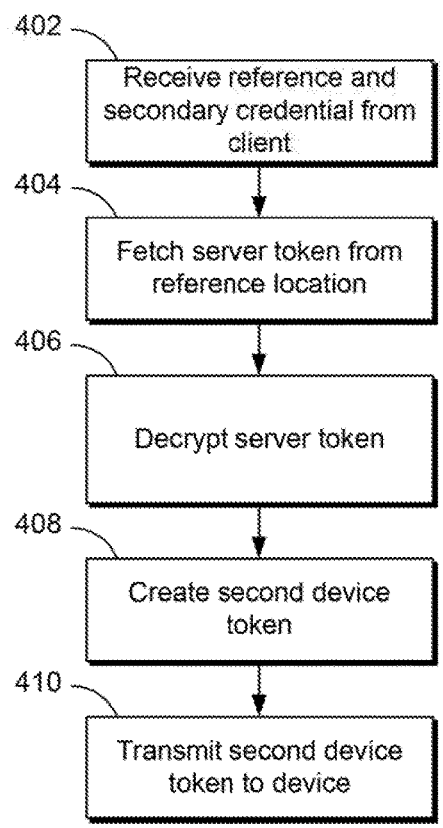
FIG. 4 illustrates a flowchart of a second authentication of a user on a server, according to an example of the present disclosure.

FIG. 4 illustrates a flowchart of a second or subsequent authentication of a user on a server, according to an example of the present disclosure. The flow of FIG. 4 may be implemented as hardware or as a combination of hardware and software, such as in server 112. For example, the flow of FIG. 4 may represent executable instructions stored on machine-readable storage media and executed by a processor on server 112.

In block 402, the reference and secondary credential may be received from the device and, in block 404, the server token previously stored may be fetched from the referenced location. The server token may be located by applying a deterministic transformation function, such as a cryptographic hash function, on a reference. If the reference cannot be found, the user may have provided an invalid reference, or the reference and/or server token may have been revoked or deleted, e.g., from token database 114 to invalidate the token. Revocation may be necessary or desired, e.g., after a security breach, or If a device is moved to a less secure location, etc.

In block 406, the server token may be decrypted. As discussed above with respect to block 214, various decryption methods may be used to decrypt the token. For example, a decryption key may be derived from user input such as a secondary credential, a user provided secret, a photo of a user, or any input available to the server to increase the level of entropy, or a server may decrypt the server token using a hash value of a user input and the server token reference. After decryption in block 406, the token may be readable by server 112. If decryption fails, e.g., if a user provides an incorrect secondary credential, a failure counter may be incremented. If a pre-set or configurable number of failures are reached, the reference and/or server token may be revoked or deleted, such that the user may be prompted to then login using primary credentials, e.g., as shown in FIG. 2.

In block 408, the server may create a second device token, which may be based on the server token, to be transmitted to the device. When received by the device, in an example, the device may re-activate the previous authentication session using the second or "new" device token received from block 410. In some examples, the new authentication session may be derived from the previous or initial authentication. In other examples, a new session may be created locally on the device based on the new device token from the server.

With respect to FIGS. 2-4, in some examples, server 112 may request that a subsequent login use primary credentials, e.g., server 112 may request that the flow of FIG. 2 be repeated even for a subsequent authentication after a user has logged in previously and after the user identifier has been stored on the device. For example, server 112 may request that a full authentication with primary credentials such as a username and password be carried out by each device after a pre-set or configurable time period, or may request primary credential authentication after a security breach on a device, server, or network.

In some examples, a scalable security model may be used to determine whether authentication with primary credentials, or re-activation of a previous authentication with a secondary credential, is to be requested at any given time. The security model may be based on device location, device type, desired security level, detected breaches, or other criteria.

In some examples, the involvement of a central server, e.g., server 112, allows for rich logging and tracking of user activity. For example, data related to user authentication and activity may be stored in a database such as audit database 116. The data of audit database 116 may be used to analyze and understand how users interact with devices, e.g., devices 102-110, and/or servers or services, e.g., server 112.

Figure 5:
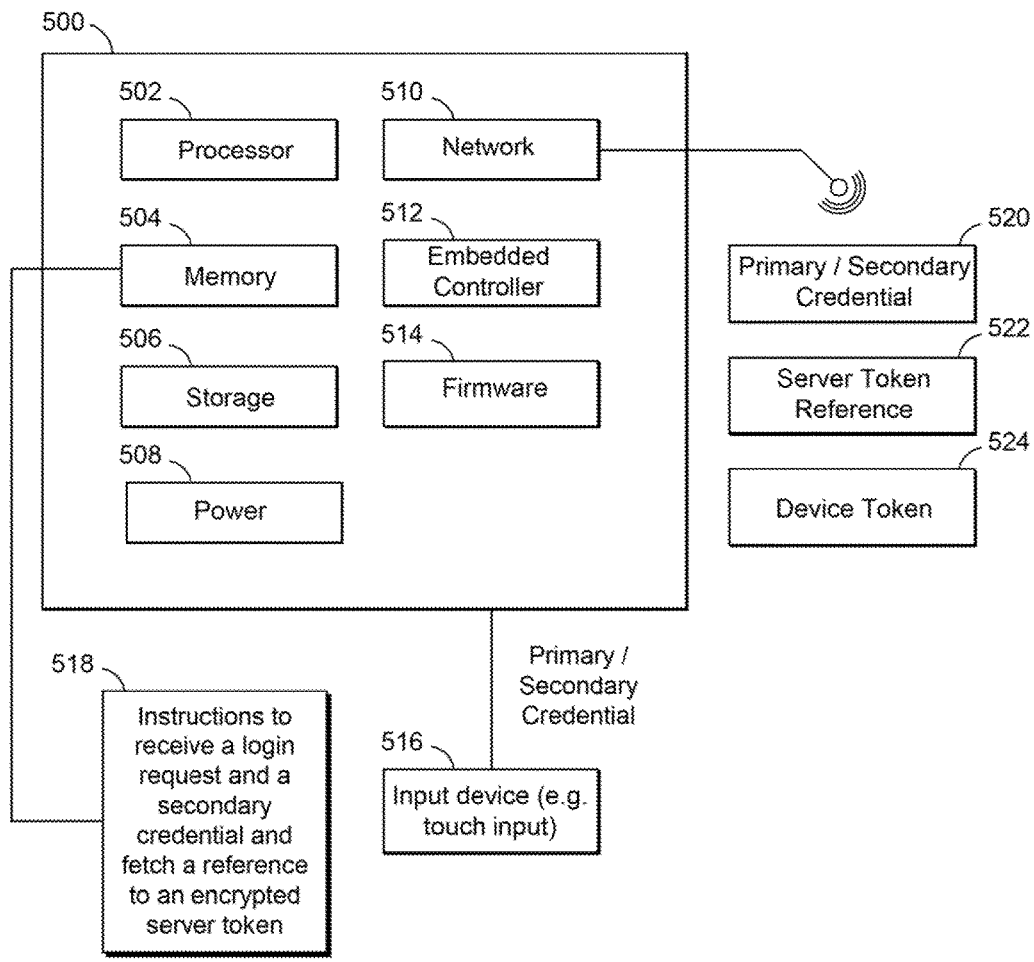
FIG. 5 illustrates a schematic representation of a computing device that may be used as a platform for implementing or executing at least one of the processes depicted in FIGS. 2-4, according to an example of the present disclosure.

FIG. 5 illustrates a schematic representation of a computing device that may be used as a platform for implementing or executing at least one of the processes depicted in FIGS. 2-4 according to an example of the present disclosure.

In an example, device 500 comprises a processor or CPU 502, memory 504, storage 506, power source 508, network interface 510, embedded controller 512, and firmware 514, all of which may be coupled by a bus or other interconnect. In some examples, device 500 may also comprise a computer readable medium, which may comprise an operating system, network applications, and/or an authentication function. In the case of a device such as a printer, device 500 may also comprise an input device 516, such as a touchscreen input.

Some or all of the operations set forth in the figures may be contained as a utility, program, or subprogram in any desired computer readable storage medium, or embedded on hardware. In addition, the operations may be embodied by machine-readable instructions. For example, they may exist as machine-readable instructions in source code, object code, executable code, or other formats. The computer readable medium may also store other machine-readable instructions, including instructions downloaded from a network or the internet.

The computer-readable medium may also store a firmware that may perform basic tasks such as recognizing input from input devices, such as a keyboard or a keypad; sending output to a display; keeping track of files and directories on a computer readable medium; and managing traffic on a bus. The network applications may include various components for establishing and maintaining network connections, such as machine readable instructions for implementing communication protocols including but not limited to TCP/IP, HTTP, HTTPS, Ethernet, USB, and FireWire.

In an example where the device of FIG. 5 is a device for entering a secondary credential such as a printer, memory 504 may store instructions 518 to receive a login request and a secondary credential and fetch a reference to an encrypted server token, as discussed above with respect to FIG. 4 and block 404. The instructions may be executed by, e.g., processor 502. In an example where the device of FIG. 5 is a server, e.g., server 112, memory 504 may store instructions for, e.g., carrying out the steps of FIGS. 2 and 4.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method of authenticating a user of a computing device, comprising:
   receiving a user login request with at least one primary credential from a computing device;
   validating the at least one primary credential to authenticate the user;
   creating a first device token and transmitting the first device token to the computing device;
   receiving a secondary credential from the computing device;
   creating a server token and a server token reference;
   encrypting and storing the server token; and
   sending the server token reference to the computing device for use in a subsequent authentication with the secondary credential.

2. The method according to claim 1, wherein the subsequent authentication comprises re-activating a previous authentication session.

3. The method according to claim 1, further comprising receiving the server token reference and the secondary credential from the computing device, fetching the server token from the reference, decrypting the server token, creating a second device token, and transmitting the second device token to the computing device.

4. The method according to claim 1, wherein the server token reference is stored on the computing device.

5. The method according to claim 1, wherein encrypting the server token comprises using a key derived from a user input.

6. The method according to claim 5, wherein the user input is the secondary credential.

7. The method according to claim 1, wherein encrypting the server token comprises using a hash value of a user input and the server token reference.

8. The method according to claim 1, further comprising associating the server token reference with a user identifier for display on the computing device.

9. A computing device comprising:
a processor;
a memory; and
a network interface,
wherein the memory comprises instructions executable by the processor to receive a login request and a credential for re-activating an authentication session from a user entered on the computing device and fetch a reference stored on the computing device to an encrypted server token, and
wherein the network interface is to transmit the reference and the credential for re-activating an authentication session to a server for decryption, and
wherein the network interface is to receive a device token from the server to re-activate an authentication session.

10. The computing device according to claim 9, wherein the login request comprises a user identifier associated with the reference stored on the computing device to the encrypted server token.

11. The computing device according to claim 9, wherein the network interface is to receive the device token from the server following decryption of the encrypted server token.

12. The computing device according to claim 9, wherein the processor is to authenticate a session on the computing device using the device token.

13. The computing device according to claim 9, further comprising a touch input device for selecting a user identifier associated with the reference to the encrypted server token stored on the computing device.

14. A non-transitory computer readable storage medium on which is embedded a computer program, said computer program to authenticate a user of a computing device, said computer program comprising a set of instructions executable by a processor:
receive a first login request with a primary credential from a computing device;
create a first device token and transmit the first device token to the computing device;
receive a secondary credential from the computing device;
create an encrypted server token and an encrypted server token reference;
send the encrypted server token reference to the computing device;
receive a second login request with the secondary credential and the encrypted server token reference from the computing device;
fetch the server token from the encrypted server token reference and decrypt the server token, and
transmit a second device token to the computing device to authenticate a user.

15. The non-transitory computer readable storage medium of claim 14, wherein the secondary credential is a personal identification number.

* * * * *

UNITED STATES PATENT AND TRADEMARK OFFICE
CERTIFICATE OF CORRECTION

PATENT NO. : 10,423,796 B2  
APPLICATION NO. : 15/515283  
DATED : September 24, 2019  
INVENTOR(S) : Michael B Beiter et al.

Page 1 of 1

It is certified that error appears in the above-identified patent and that said Letters Patent is hereby corrected as shown below:

On the Title Page

Column 2, item (56), Foreign Patent Documents, Line 2, delete "WO-2013081150" and insert -- WO-2013061150 --, therefor.

Signed and Sealed this  
Seventeenth Day of March, 2020

Andrei Iancu  
*Director of the United States Patent and Trademark Office*